(12) United States Patent
Zhao

(10) Patent No.: US 9,140,919 B2
(45) Date of Patent: Sep. 22, 2015

(54) PACKAGE STRUCTURE OF LIQUID CRYSTAL DISPLAY MODULE

(71) Applicants: BOE Technology Group Co., Ltd., Beijing (CN); Beijing BOE Display Technology Co., Ltd., Beijing (CN)

(72) Inventor: Feng Zhao, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 112 days.

(21) Appl. No.: 14/072,000

(22) Filed: Nov. 5, 2013

(65) Prior Publication Data

US 2014/0132880 A1    May 15, 2014

(30) Foreign Application Priority Data

Nov. 13, 2012   (CN) ...................... 2012 2 0598712 U

(51) Int. Cl.
*G02F 1/1333*    (2006.01)

(52) U.S. Cl.
CPC ..................... *G02F 1/133308* (2013.01); *G02F 2001/133314* (2013.01); *G02F 2001/133317* (2013.01); *G02F 2001/133325* (2013.01); *G02F 2201/465* (2013.01)

(58) Field of Classification Search
CPC ..................... G02F 2201/465; G02F 1/133308; G02F 2001/133317; G02F 2001/133314
See application file for complete search history.

(56) References Cited

U.S. PATENT DOCUMENTS

| 2009/0225252 A1* | 9/2009 | Jeong ............................... 349/58 |
| 2012/0212966 A1* | 8/2012 | Wang et al. .................... 362/362 |
| 2013/0027857 A1* | 1/2013 | Jeong ....................... 361/679.01 |
| 2013/0194781 A1* | 8/2013 | Kim .............................. 362/97.1 |
| 2013/0201421 A1* | 8/2013 | Yu ................................... 349/58 |

* cited by examiner

*Primary Examiner* — Michael Caley
*Assistant Examiner* — Jia Pan
(74) *Attorney, Agent, or Firm* — Frommer Lawrence & Haug LLP

(57) ABSTRACT

The present invention discloses a package structure of a LCD module without additional fixing and connection devices such as screws, thereby increasing the possibility of further narrowing the frame and improving assembly efficiency of the product line. The package structure of LCD module comprises interlocking back plate, protection frame and front frame.

13 Claims, 4 Drawing Sheets

PACKAGE STRUCTURE OF LIQUID CRYSTAL DISPLAY MODULE

FIELD OF THE INVENTION

The present invention relates to the field of liquid crystal displays (LCDs more particularly, to a package structure of a LCD module.

BACKGROUND OF THE INVENTION

With the development of technologies and growing expectations of people, people are not longer satisfied with traditional Cathode Ray Tube (CRT) displays which are bulky, heavy and power consuming. Compact, lightweight and low power consuming displays are desired, especially in portable, compact and power saving applications. Driven by such requirements, LCDs are accordingly designed. The LCDs have the advantages of thin, lightweight, low power consumption, low radiation, plane rectangular display, and unflickering stable images. With the constant decrease in LCD prices, the LCDs have been popular in the market and gradually became mainstream displays instead of the CRTs.

With further development in technologies, people are having higher expectations for LCDs. Thus, the display area of a LCD is getting larger, the thickness of a LCD is getting smaller, and the frame of a LCD is becoming narrower.

The inventors found that a conventional package structure of a LCD normally comprises a front frame, a protection frame and a backplate, which are assembled and then further securely connected by connection devices such as screws. Such design makes it impossible to further reduce the width of the frames. Moreover, with the increase in LCD sizes, more fixing and connection devices are required for the assembly of LCDs, lowering the assembly efficiency of the production line.

SUMMARY OF THE INVENTION

The present invention provides a package structure of a LCD module, which requires no complementary fixing and connection devices such as screws, thereby increasing the possibility of further narrowing the frame and improving assembly efficiency of the product line.

Specifically, the present invention employs the following technical solutions.

A package structure of a liquid crystal module comprises a backplate, a protection frame and a front frame, the backplate has a receiving element, at least two plug elements which are formed as a tooth shape and a connection element connecting the receiving element and the plug elements, the receiving element is a planar plate structure, the connection element is perpendicular to the receiving element and extends towards the front frame, the plug elements are disposed on the connection element; the protection frame has a first bearing portion, a second bearing portion, a support portion, and at least two abutment portions each of which is a planar plate structure, the first bearing portion and the abutment portions are respectively positioned on both sides of a same end of the second bearing portion, the support portion and the abutment portions are positioned on a same side of the second bearing portion; the front frame has a nip portion and a cover portion perpendicular to each other and both having a planar plate structure, the nip portion has at least two jacks disposed therein matching the plug elements; wherein the plug elements of the backplate penetrate through the abutment portion of the protection frame and plug into the jacks in the nip portion of the front frame, the abutment portions of the protection frame interleave with the plug elements of the backplate, the abutment portions of the protection frame abut against the nip portion of the front frame, the cover portion of the front frame is supported by the first bearing element, the support portion of the protection frame is disposed on the receiving element of the backplate.

Preferably, are end portion of the first bearing portion of the protection frame has at least two notches, the cover portion of the front frame has at least two hooks, the hooks and tie notches match with each other.

Preferably, an end surface of the hook abuts against a side wall of the notch.

Preferably, the first bearing portion, the abutment portions and the support portion are all perpendicular to the second bearing portion.

Preferably, a material of the protection frame includes polycarbonate (PC).

Preferably, a material of the protection frame is a mixture of 90% PC and 10% glass fiber.

Preferably, a material of the front frame is electrogalvanized steel sheet.

Preferably, a material of the backplate is electrogalvanized steel sheet.

In the technical solutions of the present invention, the packages of LCD modules are simply realized by the interlocking and caging of the backplate, the protection frame and the front frame, without the fixing and connection devices such as screws, thereby improving assembly efficiency of the production line. Moreover, there is no need to reserve assembly area for the fixing and connection devices in advance on the backplate, the protection frame or the front frame, thus increasing the possibility of further narrowing the frame of the LCDs, which facilitates the trend of having light and thin LCDs.

BRIEF DESCRIPTION OF THE DRAWINGS

In order to clearly illustrate the technical solutions of the present invention or prior art, the drawings for describing the embodiments will be briefly described below. Obviously, the described drawings are only related to some embodiments of the present invention and the person skilled in the art may arrive at other drawings based on these drawings without any creative effort, wherein.

Figure 1:
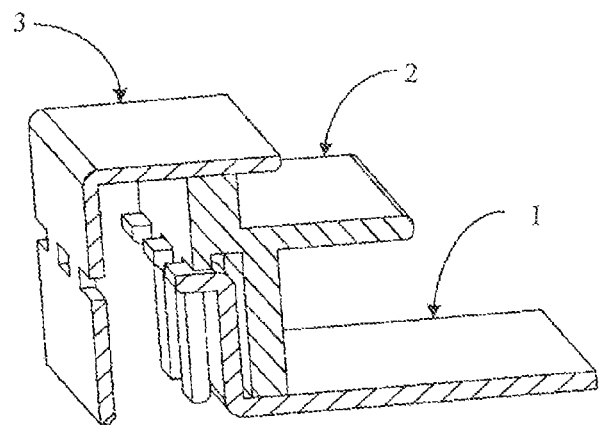
FIG. 1 is a first schematic configuration of a package structure of a LCD module according to an embodiment of the present invention.

REFERENCE NUMERALS 1. backplate; 11. receiving element; 12. plug element;
13. connection element; 2. protection frame; 21. first bearing portion;
211. notch; 22. second bearing portion; 23. support portion;
24. abutment portion; 3. front frame; 31. nip portion;
311. jack; 32. cover portion; 321. hook;
4. screw

DETAILED DESCRIPTION OF EMBODIMENTS

FIG. 1 is a first schematic configuration of a package structure of a LCD module according to an embodiment of the present invention.

As illustrated in FIG. 1, the package structure of LCD module comprises a backplate 1, a protection frame 2 and a front frame 3.

Figure 2:
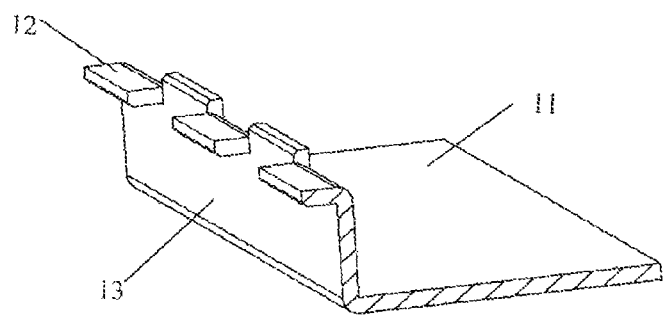
FIG. 2 is a schematic configuration of a backplate according to an embodiment of the present invention.

FIG. 2 is a schematic configuration of a backplate according to an embodiment of the present invention.

Specifically, as illustrated in FIG. 2, the backplate 1 has a receiving element 11, at least two plug elements 12 which are formed as a tooth shape and a connection element 13 connecting the receiving element 11 and the plug elements 12, the receiving element 11 is a planar plate structure, the connection element 13 is perpendicular to the receiving element 11 and extends towards the front frame 3, the plug elements 12 are disposed on the connection element 13.

Figure 3:
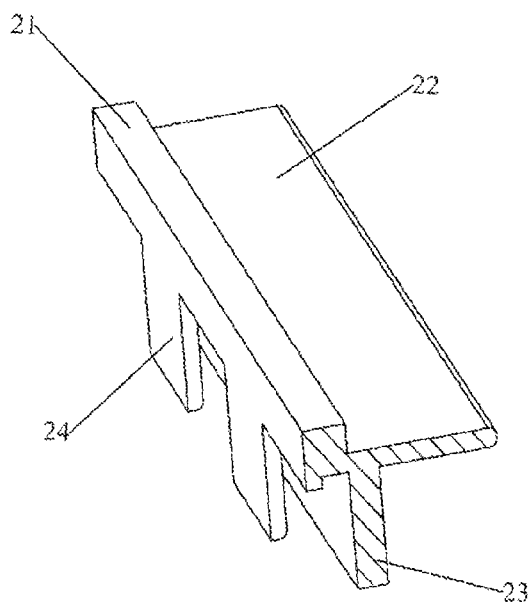
FIG. 3 is a first schematic configuration of a protection frame according to an embodiment of the present invention.

FIG. 3 is a first schematic configuration of a protection frame according to an embodiment of the present invention.

As illustrated in FIG. 3, the protection frame 2 has a first bearing portion 21, a second bearing portion 22, a support portion 23, and at least two abutment portions 24 each of which is a planar plate structure, the first bearing portion 21 and the abutment portions 24 are respectively positioned on both sides of a same end of the second bearing portion 22, the support portion 23 and the abutment portions 24 are positioned on a same side of the second bearing portion 22.

Figure 4:
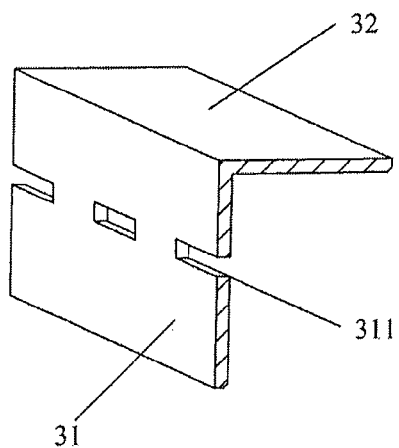
FIG. 4 is a first schematic configuration of a front frame according to air embodiment of the present invention.

FIG. 4 is a first schematic configuration of a front frame according to an embodiment of the present invention.

As illustrated in FIG. 4, the front frame 3 has a nip portion 31 and a cover portion 32 perpendicular to each other and both having a planar plate structure, the nip portion 31 has at least two jacks 311 disposed therein matching the plug elements 12.

Referring to FIG. 1 again, as illustrated in FIG. 1, the plug elements 12 of the backplate 1 penetrate through the abutment portions 24 of the protection frame 2 and plug to the jacks 311 in the nip portion 31 of the front frame 3, the abutment portions 24 of the protection frame 2 interleave with the plug elements 12 of the backplate 1, the abutment portions 24 of the protection frame 2 abut against the nip portion 31 of the front frame 3, the cover portion 32 of the front frame 3 is supported by the first bearing element 21, the support portion 23 of the protection frame 2 is disposed on the receiving element 11 of the backplate 1, as such, the backplate 1, the protection frame 2 and the front frame 3 of the whole package structure of LCD module are integrated as one.

Figure 5:
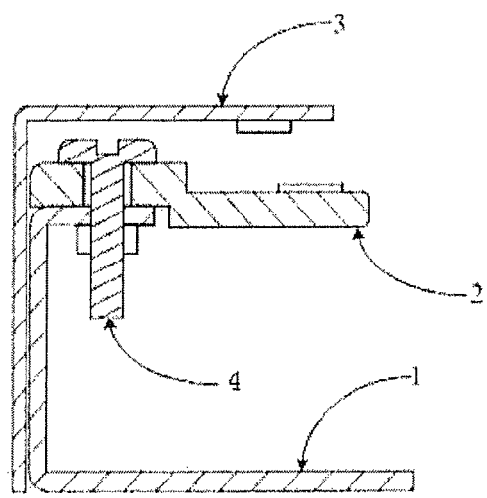
FIG. 5 is a first schematic configuration of a package structure of a LCD module in prior art.
Figure 6:
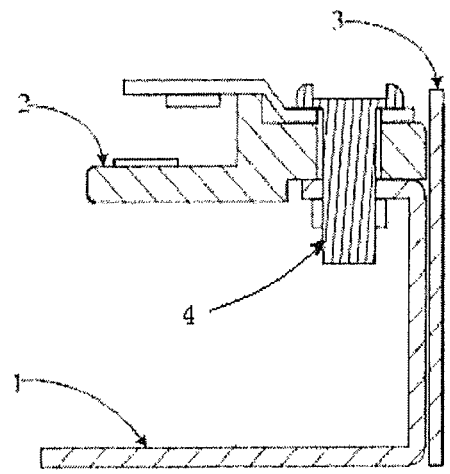
FIG. 6 is a second schematic configuration of a package structure of a LCD module in prior art.
Figure 7:
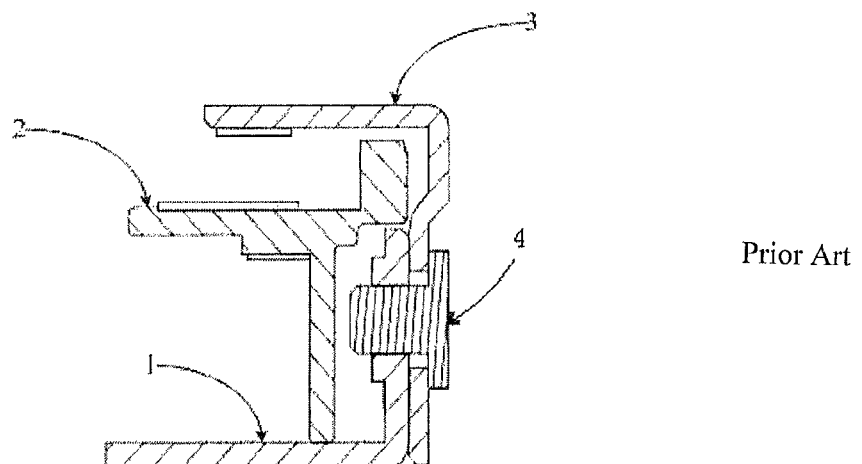
FIG. 7 is a third schematic configuration of a package structure of a LCD module in prior art.

FIG. 5 is a first schematic configuration of a package structure of a LCD module in prior art. FIG. 6 is a second schematic configuration of a package structure of a LCD module in prior art. FIG. 7 is a third schematic configuration of a package structure of a LCD module in prior art.

FIGS. 5, 6 and 7 illustrate three typical package structures of LCD modules used in prior art. It can be seen from FIG. 5, FIG. 6 or FIG. 7 that, in the package structures of LCD modules in prior art, a region reserved for fixing and connection devices such as a screw 4 has to be configured in advance on the backplate 1, the protection frame 2 and the front frame 3, such that the package structures of LCD modules may be securely connected and assembled by the fixing and connection devices. The presence of the fixing and connection devices such as the screw makes it impossible to further reduce the size of the package structure of LCD module, which lowers the possibility of further narrowing the frame of the LCD.

Therefore, compared with prior art, the package structure of LCD module according to the embodiment of the present invention may realize package of LCD module simply by the interlocking and caging of the backplate 1, the protection frame 2 and the front frame 3, without the fixing and connection devices such as screws, thus improving assembly efficiency of the production line. Moreover, in the package structure of LCD module according to the embodiment of the present invention, there is no need to reserve assembly area for the fixing and connection devices in advance on the backplate, the protection frame or the front frame, thus increasing the possibility of further narrowing the frame of the LCDs, which facilitates the trend of having light and thin LCDs.

An assembly procedure of the package structure of LCD modules according to the embodiment of the present invention is generally as follows. First, the backlight module of LCD module is placed on the receiving element 11 of the backplate 1; then the protection frame 2 is also placed on the receiving element 11, specifically, the support portion 23 of the protection frame 2 is placed on the receiving element 11 of the backplate 1, therefore the backlight module is surrounded by the protection frame 2, and the abutment portions 24 of the protection 2 and the plug elements 12 of the backplate 1 exactly form an interlacing structure. Thereafter, the liquid crystal panel is placed on the second bearing portion 22 of the protection frame 2, such that the liquid crystal panel is supported by the second bearing portion 22; the front frame 3 is then placed on the protection frame 2, such that the plug elements 12 of the backplate 1 go through the abutment portions 24 of the protection 2 and plug into the jacks 311 in the nip portion 31 of the front frame 3, therefore the cover portion 32 of the front frame 3 covers edge areas of the liquid crystal panel, the abutment portions 24 of the protection frame 2 abut against the nip portion 31 of the front frame 3, and the cover portion 32 of the front frame 3 is supported by the first bearing portion 21.

Figure 8:
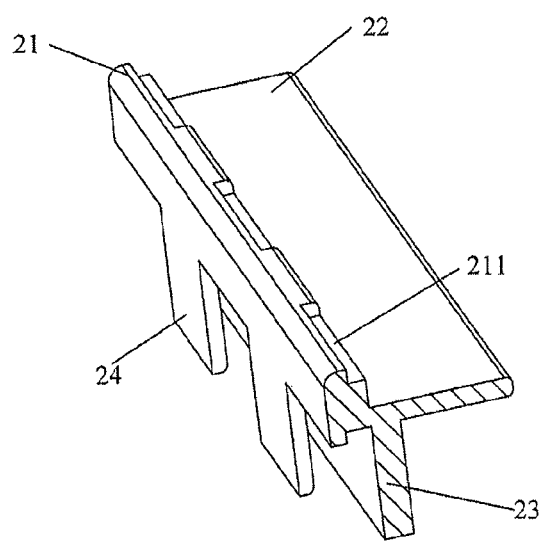
FIG. 8 is a second schematic configuration of a protection frame according to an embodiment of the present invention.
Figure 9:
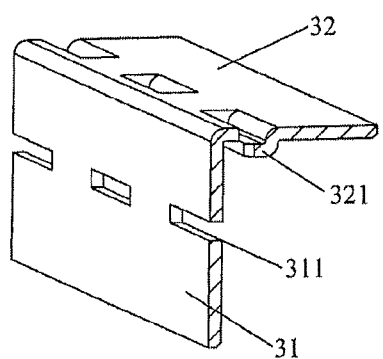
FIG. 9 is a second schematic configuration of a front frame according to an embodiment of the present invention.
Figure 10:
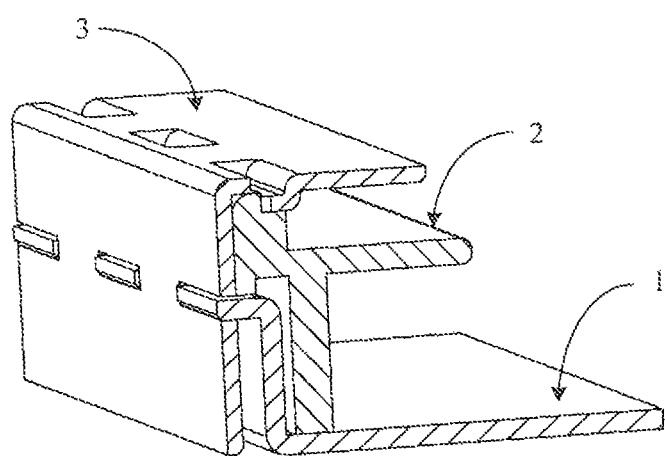
FIG. 10 is a second schematic configuration of a package structure of a LCD module according to an embodiment of the present invention.

FIG. 8 is a second schematic configuration of a protection frame according to an embodiment of the present invention. FIG. 9 is a second schematic configuration of a front frame according to an embodiment of the present invention. FIG. 10 is a second schematic configuration of a package structure for a LCD module according to an embodiment of the present invention.

Further, to make the whole package structure of LCD module more stable, as illustrated in FIG. 8, an end portion of the first bearing portion 21 of the protection frame 2 has at least two notches 211. Accordingly, as illustrated in FIG. 9, the cover portion 32 of the front frame 3 has at least two hooks 321, the hooks 321 and the notches 211 match with each other. Specifically, as illustrated in FIG. 10, an end surface of the hook 321 abuts against a side wall of the notch 211, such that the front frame 3 cannot be easily removed.

Generally, in consideration of usage effect, fabrication processes and cost, the first bearing portion 21, the abutment portions 24 and the support portion 23 are all perpendicular to the second bearing portion 22. Preferably, the material of the protection frame 2 includes PC. More preferably, the material of the protection frame 2 is a mixture of 90% PC and 10% glass fiber Further, the material of the front frame 3 is optionally electrogalvanized steel sheet or other rigid material. A material of the backplate 1 is optionally electrogalvanized steel sheet or other metal (such as aluminum) material.

It should be noted that the above described backplate 1, the protection frame 2 and the front frame 3 are individual components of the package structure of LCD module as proposed by the present invention, and they work together to form a complete package structure of LCD module.

The technical solutions of the above embodiments provide package structures of LCD module, and the structures comprise a backplate, a protection frame, a front frame. The packages of LCD module can be simply realized by the interlocking and caging of the backplate, the protection frame and the front frame, without fixing and connection devices such as screws, thus improving assembly efficiency of the production line. Moreover, in the package structures of LCD module of the above embodiments there is no need to reserve assembly area for the fixing and connection devices in advance on the backplate, the protection frame or the front frame, thus increasing the possibility of further narrowing the frame of LCDs, which facilitates the trend of having light and thin LCDs.

The above only describe the illustrative embodiments of the present invention, however, the protection scope of the present invention is not limited thereto. Various modifications and variations which can be easily thought of by the person skilled in the art within the technical scope disclosed by the present invention should be considered as within the protection scope of the present invention. The protection scope of the present invention is therefore defined by the accompanying claims.

The invention claimed is:

1. A package structure of a liquid crystal module comprising a back plate, a protection frame and a front frame, wherein:
   the back plate has a receiving element, at least two plug elements which are formed as a tooth shape and a connection element connecting the receiving element and the plug elements, the receiving element is a planar plate structure, the connection element is perpendicular to the receiving element and extends towards the front frame, the plug elements are disposed on the connection element;
   the protection frame has a first bearing portion, a second bearing portion, a support portion, and at least two abutment portions each of which is a planar plate structure, the first bearing portion and the abutment portions are respectively positioned on opposite sides at a same end the second bearing portion, the support portion and the abutment portions are positioned on a same side of the second bearing portion;
   the front frame has a nip portion and a cover portion perpendicular to each other and both having a planar plate structure, the nip portion has at least two jacks disposed therein matching the plug elements;
   wherein, the plug elements of the back plate penetrate through the abutment portions of the protection frame and plug to the jacks in the nip portion of the front frame, the abutment portions of the protection frame interleave with the plug elements of the back plate, the abutment portions of the protection frame abut against the nip portion of the front frame, the cover portion of the front frame is supported by the first bearing element, the support portion of the protection frame is disposed on the receiving element of the back plate and one end of the support portion directly contacts in abutment with the receiving element.

2. The package structure of a liquid crystal module of claim 1, wherein:
   an end portion of the first bearing portion of the protection frame has at least two notches, the cover portion of the front frame has at least two hooks, the hooks and the notches match with each other.

3. The package structure of a liquid crystal module of claim 2, wherein:
   an end surface of the hook abuts against a side wall of the notch.

4. The package structure of a liquid crystal module of claim 1, wherein:
   the first bearing portion, the abutment portions and the support portion are all perpendicular to the second bearing portion.

5. The package structure of a liquid crystal module of claim 2, wherein:
   the first bearing portion, the abutment portions and the support portion are all perpendicular to the second bearing portion.

6. The package structure of a liquid crystal module of claim 3, wherein;
   the first bearing portion, the abutment portions and the support portion are all perpendicular to the second bearing portion.

7. The package structure of a liquid crystal module of claim 1, wherein:
   a material of the protection frame includes polycarbonate.

8. The package structure of a liquid crystal module of claim 7, wherein:
   the material of the protection frame is a mixture of 90% polycarbonate and 10% glass fiber.

9. The package structure of a liquid crystal module of claim 1, wherein:
   a material of the front frame is electrogalvanized steel sheet.

10. The package structure of a liquid crystal module of claim 1, wherein:
    a material of the back plate is electrogalvanized steel sheet.

11. The package structure of a liquid crystal module of claim 1, wherein each abutment portion individually extends from the same end of second bearing portion.

12. The package structure of a liquid crystal module of claim 1, wherein the abutment portions are spaced apart from one another along the same end of the second bearing portion.

13. The package structure of a liquid crystal module of claim 11, wherein the abutment portions are spaced apart from one another along the same end of the second bearing portion.

* * * * *